United States Patent
Koshihashi

(10) Patent No.: US 10,001,961 B2
(45) Date of Patent: Jun. 19, 2018

(54) DISPLAY DEVICE, DISPLAY SYSTEM, METHOD FOR CONTROLLING DISPLAY DEVICE, AND METHOD FOR CONTROLLING ELECTRONIC APPARATUS

(71) Applicant: Seiko Epson Corporation, Tokyo (JP)

(72) Inventor: Toru Koshihashi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 9 days.

(21) Appl. No.: 15/214,671

(22) Filed: Jul. 20, 2016

(65) Prior Publication Data

US 2017/0024180 A1 Jan. 26, 2017

(30) Foreign Application Priority Data

Jul. 23, 2015 (JP) ................. 2015-145584

(51) Int. Cl.

| G06F 1/00 | (2006.01) |
|---|---|
| G06F 3/14 | (2006.01) |
| G06F 3/041 | (2006.01) |
| G06F 3/0482 | (2013.01) |
| G02F 1/1333 | (2006.01) |
| H04N 9/31 | (2006.01) |
| G09G 3/00 | (2006.01) |

(52) U.S. Cl.
CPC ........ *G06F 3/1446* (2013.01); *G02F 1/13338* (2013.01); *G06F 3/0412* (2013.01); *G06F 3/0416* (2013.01); *G06F 3/0482* (2013.01); *G09G 3/001* (2013.01); *H04N 9/3147* (2013.01); *H04N 9/3179* (2013.01); *H04N 9/3194* (2013.01); *G09G 2300/026* (2013.01); *G09G 2370/042* (2013.01); *G09G 2370/16* (2013.01)

(58) Field of Classification Search
CPC combination set(s) only.
See application file for complete search history.

(56) References Cited

U.S. PATENT DOCUMENTS

| 8,086,704 B2 | 12/2011 | Honma |
|---|---|---|
| 2005/0157218 A1 | 7/2005 | Honma |
| 2011/0082903 A1 | 4/2011 | Hanna |

FOREIGN PATENT DOCUMENTS

| JP | 2007-43725 A | 2/2007 |
|---|---|---|
| JP | 2010-258721 A | 11/2010 |
| JP | 2014-107713 A | 6/2014 |

*Primary Examiner* — Van N Chow
(74) *Attorney, Agent, or Firm* — ALG Intellectual Property, LLC

(57) ABSTRACT

A projector includes: an input accepting unit which accepts an input of first group information from a user; a receiving unit which receives, from each of other projectors connected via a network, second identification information for identifying these projectors, and second group information inputted to these projectors by the user; a generation unit which generates a selection screen for selecting a projector to be operated, first identification information for identifying the projector being associated with the first group information that is inputted in the screen, the second identification information being associated with the second group information in the screen; and a display unit which displays the selection screen that is generated.

8 Claims, 11 Drawing Sheets

| PROJECTOR 10A | 192.168.1.60 |
|---|---|
| PROJECTOR 10B | 192.168.1.70 |
| PROJECTOR 10C | 192.168.1.100 |
| PROJECTOR 10D | 192.168.1.110 |
| PROJECTOR 10E | 192.168.1.80 |
| PROJECTOR 10F | 192.168.1.90 |

| PROJECTOR 10A | 192.168.1.60 |
| --- | --- |
| PROJECTOR 10B | 192.168.1.70 |
| PROJECTOR 10C | 192.168.1.100 |
| PROJECTOR 10D | 192.168.1.110 |
| PROJECTOR 10E | 192.168.1.80 |
| PROJECTOR 10F | 192.168.1.90 |

DISPLAY DEVICE, DISPLAY SYSTEM, METHOD FOR CONTROLLING DISPLAY DEVICE, AND METHOD FOR CONTROLLING ELECTRONIC APPARATUS

The entire disclosure of Japanese Patent Application No. 2015-145584, filed Jul. 23, 2015 is expressly incorporated by reference herein.

BACKGROUND

1. Technical Field

The present invention relates to a technique for splitting a plurality of connected apparatuses into groups and controlling each group.

2. Related Art

A technique is known in which a plurality of apparatuses connected via a network is split into groups so that a predetermined function is utilized through a coordinated operation of two or more apparatuses classified as the same group. For example, in some cases, tiling projection in which partial images displayed by two or more projectors, respectively, are arranged next to each other on the same screen so as to display a picture (whole image), is carried out. The grouping of apparatuses may require the user to perform complicated operations.

In this respect, JP-A-2010-258721 discloses a technique in which a projector transmits an identification code inputted to the projector itself to a multifunctional device, and the multifunctional device preferentially displays a projector having the same identification code as the multifunctional device inputted thereto, when setting a transmission destination of image data read by a scanner. JP-A-2007-43725 discloses a technique in which, when selecting a projector to be used with the use of a computer with one or more projectors are connected thereto, the computer displays a preview image of a projector which is displaying an image, and displays the IP address of a projector which is not displaying an image. JP-A-2014-107713 discloses a technique in which, in a multi-projection system, the IP address and position of arrangement of a projector are associated with each other using an operation device such as a smartphone, thereby setting the projector as an apparatus that is operable using the operation device.

However, in the case of the technique disclosed in JP-A-2010-258721, if there is a plurality of projectors, it is difficult for the user to understand which identification code is set to which projector. In the case of the technique disclosed in JP-A-2007-43725, if there is a plurality of projectors displaying the same image, even when the user sees a preview image, it is difficult for the user to understand which projector image is shown by the preview image. In the case of the technique disclosed in JP-A-2014-107713, even when the user sees the displayed IP address of a projector, it is difficult for the user to understand which IP address is allocated to which projector.

SUMMARY

An advantage of some aspects of the invention is that a technique for making it easier for the user to group a plurality of apparatuses connected via a network in a desired combination is provided.

A display device according to an aspect of the invention includes: an input accepting unit which accepts an input of first group information; a receiving unit which receives, from another display device, second identification information of the another display device and second group information inputted to the another display device; a generation unit which generates a selection screen for selecting a display device to be operated, first identification information of the display device being associated with the first group information in the selection screen, the second identification information being associated with the second group information in the selection screen; and a display unit which displays the selection screen that is generated.

According to the aspect of the invention, the display device displays the selection screen for selecting a display device to be operated, associating the group information inputted to the display device itself with the identification information of the display device itself, and associating the group information inputted to another display device with the identification information of this another display device. Therefore, the user can select a display device to be operated, after referring to the group information displayed on the selection screen and thus grasping the group in which each display device is classified.

In the aspect of the invention, the display device may include a transmitting unit which transmits the first identification information and the first group information to the another display device.

According to the aspect of the invention with this configuration, the user can select a display device to be operated, referring to the group information displayed by the another display device.

In the aspect of the invention, the generation unit may generate, as the selection screen, a screen for associating the first identification information with a position of arrangement of an image displayed by the display device and for associating the second identification information with a position of arrangement of an image displayed by the another display device.

According to the aspect of the invention with this configuration, the user can associate the identification information of each display device with the position of arrangement of the image displayed by the display device, referring to the displayed group information.

In the aspect of the invention, the input accepting unit may accept an input of the first group information associated with a physical button that is operated.

According to the aspect of the invention with this configuration, since an input of group information associated with a physical button that is operated is accepted, the user can easily designate group information by an intuitive operation.

A display system according to another aspect of the invention includes: a first electronic apparatus; a second electronic apparatus; and a management device connected to the first electronic apparatus and the second electronic apparatus. The first electronic apparatus includes: a first input accepting unit which accepts an input of first group information via the management device; and a first transmitting unit which transmits first identification information of the first electronic apparatus and the first group information to the management device. The second electronic apparatus includes: a second input accepting unit which accepts an input of second group information via the management device; and a second transmitting unit which transmits second identification information of the second electronic apparatus and the second group information to the management device. The management device includes: a receiving unit which receives the first identification information and the first group information from the first electronic apparatus, and receives the second identification information and the second group information from the second electronic apparatus; a generation unit which generates a selection screen for selecting an electronic apparatus to be operated, the first identification information being associated with the first group information in the selection screen, the second identification information being associated with the second group information in the selection screen; and a display unit which displays the selection screen that is generated.

According to the aspect of the invention, the selection screen for selecting an electronic apparatus to be operated is displayed, associating the group information inputted to each of a plurality of electronic apparatuses with the identification information of each electronic apparatus. Therefore, the user can select an electronic apparatus to be operated, after referring to the group information displayed on the selection screen and thus grasping the group in which each electronic apparatus is classified.

In the aspect of the invention, each of the first electronic apparatus and the second electronic apparatus may be a display device.

According to the aspect of the invention with this configuration, the user can easily group the display devices in a desired combination.

In the aspect of the invention, the generation unit may generate, as the selection screen, a screen for associating the first identification information with a position of arrangement of an image displayed by the first electronic apparatus and for associating the second identification information with a position of arrangement of an image displayed by the second electronic apparatus.

According to the aspect of the invention with this configuration, the user can associate the identification information of each display device with the position of arrangement of the image displayed by the display device, referring to the displayed group information.

The invention can also be conceived in the form of a method for controlling a display device and a method for controlling an electronic apparatus as well as the display device and the display system.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings.

First Embodiment

Figures 1A, 1B:
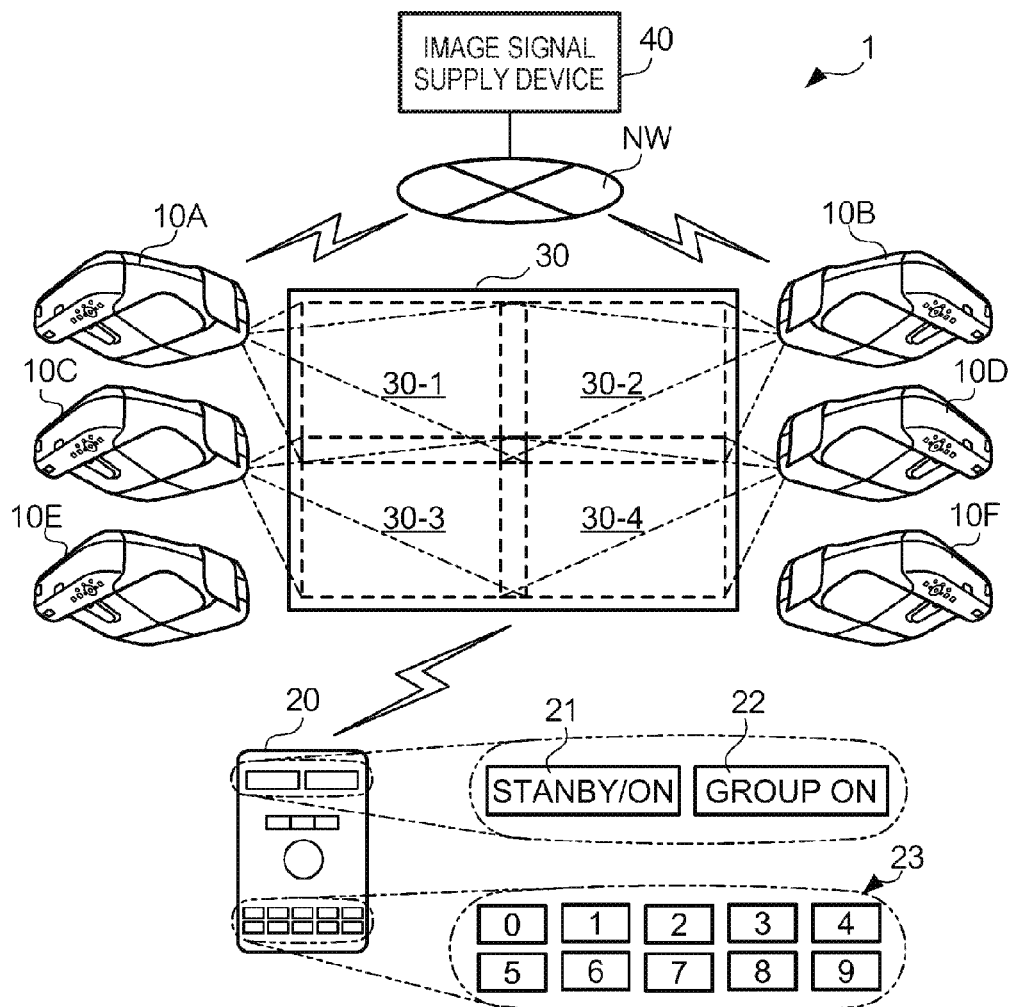
FIGS. 1A and 1B are block diagrams showing the overall configuration of a display system according to a first embodiment of the invention.

FIGS. 1A and 1B show the overall configuration of a projector system 1 according to a first embodiment of the invention. As shown in FIG. 1A, the projector system 1 is a display system including a plurality of projectors 10 (10A to 10F), a remote controller 20, and an image signal supply device 40. The projectors 10A to 10F in this example are arranged in the same room space and project an image on a screen 30. The remote controller 20 is used by the user in order to remotely control the plurality of projectors 10. The image signal supply device 40 is a personal computer, for example, and supplies an image signal for displaying an image (picture) on the screen 30, to each of the projectors 10A to 10F.

The projectors 10 are wall-mounted short throw projectors, for example, and are projection-type display devices which project an image on the screen 30 installed at a short distance. The projectors 10 project a color image based on an image signal corresponding to each color component of the primary colors of R (red), G (green) and B (blue) inputted form the image signal supply device 40. The screen 30 is a reflection-type screen, for example, and is equivalent to a projection surface where images are projected by the projectors 10. The projection surface may be provided by objects other than the screen 30, such as a wall, for example.

The projectors 10 are connected to the image signal supply device 40 and can communicate with the image signal supply device 40. Also, a projector 10 of the plurality of projectors 10 is connected to the other projectors 10 and can communicate with these projectors 10. For example, a projector 10 may be connected to a network NW and can communicate with the other projectors 10 and the image signal supply device 40. In this case, this projector 10 may be wirelessly connected to the network NW and perform wireless communication conforming to the IEEE 802.11 (Wi-Fi: trademark registered) standard. The projector 10 is connected to the network NW, using predetermined connection information. The connection information includes, for example, identification information that identifies an access point to the network NW, and authentication information used for authentication to connect to the network NW. The connection information includes, for example, security information such as an encryption key conforming to SSID (service set identifier) or WEP (wired equivalent privacy), an IP address on the network NW, and a MAC address. The IP address shown in FIG. 1B is allocated to each of the projectors 10A to 10F. The IP address is identification information to identify each projector 10. The projectors 10A to 10F communicate with each other via the network NW and exchange information for tiling projection (for example, IP address and MAC address).

The standard of the wireless communication carried out by the projectors 10 is not particularly limited and may be wireless LAN (local area network) standards other than Wi-Fi, for example. Also, in the projector system 1, the projectors 10 and the network NW may be wire-connected.

The remote controller 20 transmits a control single for remote control, by infrared communication, for example. The remote controller 20 has, as physical buttons, a "STANDBY/ON" key 21, a "GROUP ON" key 22, and ten keys 23 including keys corresponding to the individual numerical values of "0" to "9". The "STANDBY/ON" key 21 is a button to start up a projector 10 that is in a standby mode or to shift a projector 10 that has been started up to a standby mode. After the completion of startup of a projector 10, the projector 10 is in the state of being able to project an image. The "GROUP ON" key 22 is a button to start up a projector 10 in the standby mode, designating group information indicating the group classification of the projector 10. In this embodiment, the group information is designated by one of "G0" to "G9" corresponding to the respective keys of the ten keys 23. When designating the group information, the user simultaneously presses the "GROUP ON" key 22 and one of the ten keys 23. The group information is expressed by a letter string which can be easily recognized by the user and is made up of fewer letters than the IP address, for example.

In the example of FIG. 1A, the projectors 10A to 10D project partial images next to each other on the screen 30, thus performing tiling projection. More specifically, the surface of the screen 30 is divided vertically and horizontally into 2×2 projection areas 30-1, 30-2, 30-3, and 30-4. The projector 10A displays (projects) a partial image in the projection area 30-1. The projector 10B displays a partial image in the projection area 30-2. The projector 10C displays a partial image in the projection area 30-3. The projector 10D displays a partial image in the projection area 30-4. The projectors 10 have a mechanism for making it easy for the user to select two or more projectors 10 to perform tiling projection, in a desired combination. This mechanism will be described in detail later.

The tiling projection may be performed by a method in which an image signal representing a partial image is supplied to each projector 10 from the image signal supply device 40, or by a method in which an image signal representing a whole image is supplied to each projector 10 from the image signal supply device 40 and in which each projector 10 processes the supplied image signal into an image signal representing a partial image.

In the embodiment, the projector system 1 includes six projectors 10. However, projector system 1 may include five or fewer projectors 10, or seven or more projectors 10.

Figure 2:
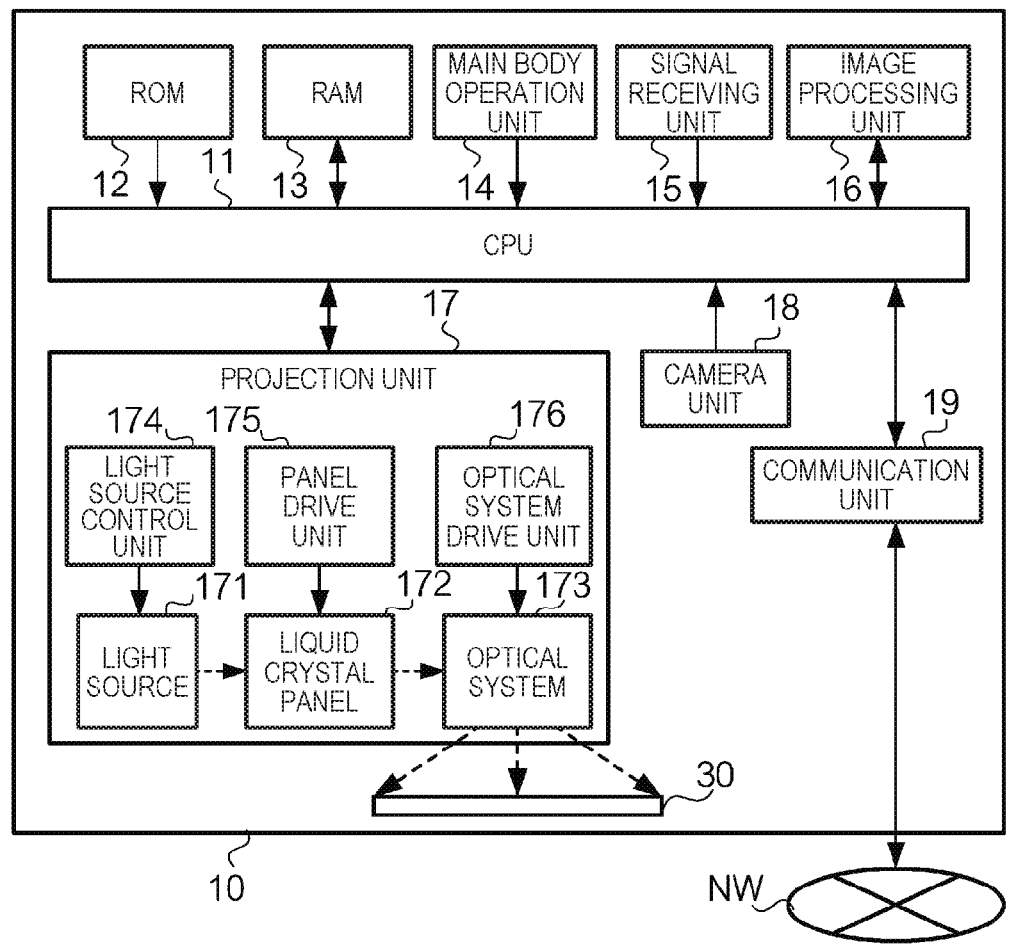
FIG. 2 shows the hardware configuration of a projector according to the first embodiment.

FIG. 2 is a block diagram showing the hardware configuration of the projector 10. As shown in FIG. 2, the projector 10 has a CPU (central processing unit) 11, a ROM (read only memory) 12, a RAM (random access memory) 13, a main body operation unit 14, a signal receiving unit 15, an image processing unit 16, a projection unit 17, a camera unit 18, and a communication unit 19.

The CPU 11 is a processor which reads out a program stored in the ROM 12 to the RAM 13 and executes the program, thereby controlling each part of the projector 10.

The main body operation unit 14 is an operation unit provided in the main body of the projector 10 for the user to carry out various operations such as turning on/off the power of the projector 10. The signal receiving unit 15 has an infrared light receiving element, for example, and receives a signal for remote control from the remote controller 20.

The image processing unit 16 has an image processing circuit such as an ASIC (application specific integrated circuit), for example, and is responsible for image processing carried out by the projector 10. The image processing unit 16 performs, for example, correction processing such as resizing or keystone correction on an image signal inputted from the image signal supply device 40 and thus generates image information for projection, under the control of the CPU 11. The correction processing is carried out on the basis of an image of the screen 30 picked up by the camera unit 18.

The projection unit 17 projects (displays) an image on the screen 30 on the basis of the image information that has been image-processed by the image processing unit 16. The projection unit 17 has a light source 171, a liquid crystal panel 172, an optical system 173, a light source control unit 174, a panel drive unit 175, and an optical system drive unit 176. The light source 171 is a solid-state light source including an LED (light emitting diode) or semiconductor diode, for example, and emits light to the liquid crystal panel 172. The liquid crystal panel 172 is a transmission-type liquid crystal panel, for example, and a light modulator which modulates the light incident from the light source 171. The liquid crystal panel 172 is provided corresponding to each of the primary colors of R, G, and B. The optical system 173 has a lens and a drive circuit for lens adjustment, for example, and magnifies and projects the light (image light) modulated by the liquid crystal panel 172 onto the screen 30. The light source control unit 174 drives the light source 171 under the control of the CPU 11. The panel drive unit 175 drives the liquid crystal panel 172 on the basis of the image information supplied from the CPU 11. The optical system drive unit 176 drives the drive circuit of the optical system 173 under the control of the CPU 11.

As the light modulator, a reflection-type liquid crystal panel may be employed, or a digital micromirror device (DMD) or the like may be employed.

The camera unit 18 has an image sensor (for example, CMOS sensor or CCD sensor) and picks up an image of the screen 30. The communication unit 19 has a wireless communication circuit and an antenna, for example, and connects to the network NW and performs wireless communication.

Figure 3:
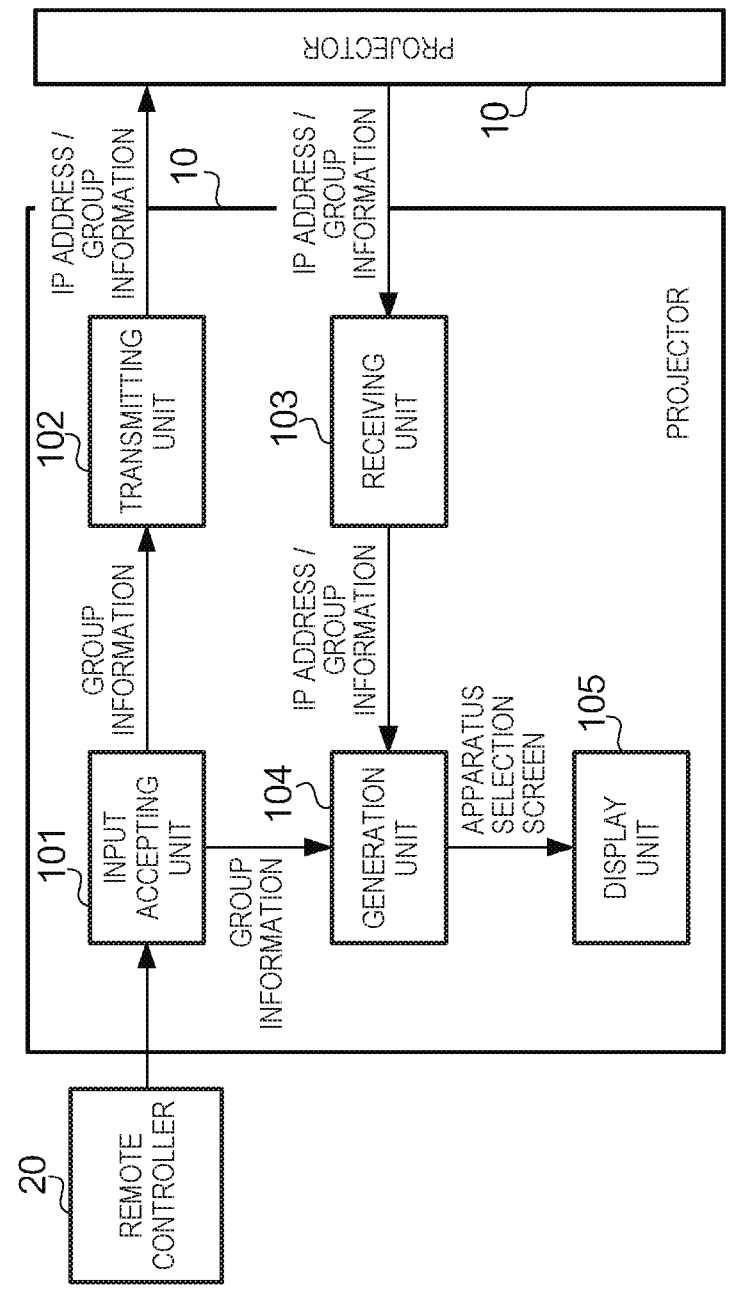
FIG. 3 shows the functional configuration of the projector according to the first embodiment.

FIG. 3 is a block diagram showing the functional configuration of the projector 10.

The projector 10 implements functions equivalent to an input accepting unit 101, a transmitting unit 102, a receiving unit 103, a generation unit 104, and a display unit 105.

The input accepting unit 101 is a unit which accepts an input of group information from the user via the remote controller 20. This group information is first group information indicating the group in which its own device is classified.

The transmitting unit 102 is a unit which transmits the identification information of its own device (first identification information) for discriminating and identifying its own device from the other projectors 10, and the group information whose input is accepted by the input accepting unit 101, to the other projectors 10. For example, the identification information may be the IP address of its own device. In this embodiment, the IP address of its own device is used as the identification information.

The receiving unit 103 is a unit which receives, from other projectors 10, identification information of the other projectors 10 (second identification information) and group information inputted to the other projectors 10 by the user. For example, this identification information may be the IP addresses of the other projectors. In this embodiment, the IP addresses of the other projectors are used as the identification information. The group information is second group information indicating a group in which the other projectors 10 are classified.

The generation unit 104 is a unit which generates a selection screen for selecting a projector 10 to be operated, on the basis of the identification information and the group information received by the receiving unit 103. The selection screen shows the identification information of its own device in association with the group information whose input is accepted by the input accepting unit 101, and the identification information and the group information received by the receiving unit 103 in association with each other.

The display unit 105 is a unit which displays the selection screen generated by the generation unit 104.

Grouping Processing

Figure 4:
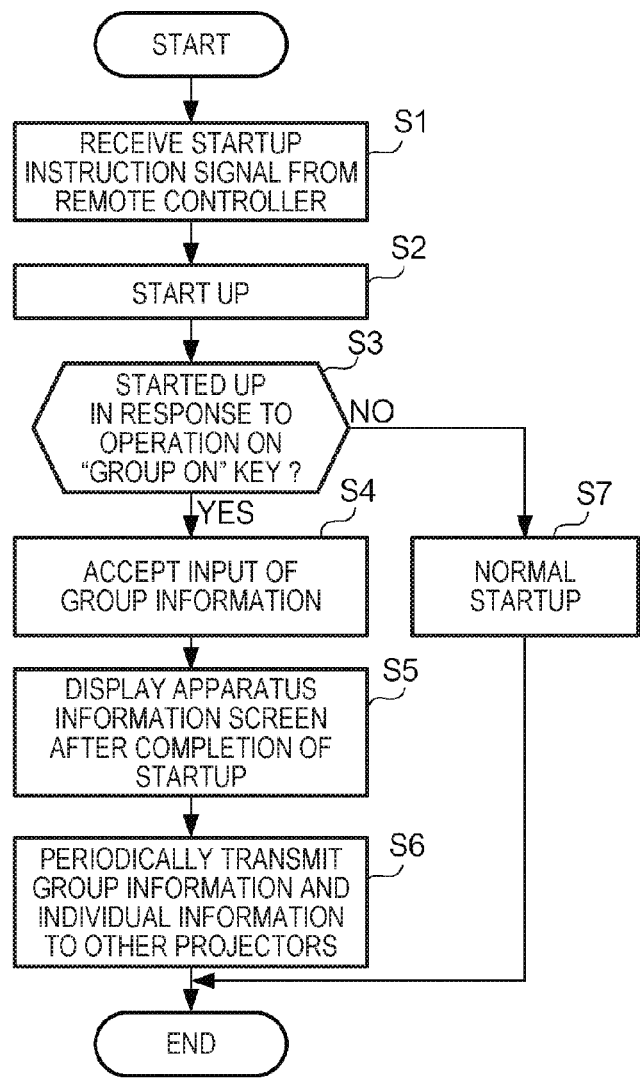
FIG. 4 is a flowchart showing grouping processing carried out by the projector according to the first embodiment.

FIG. 4 is a flowchart showing grouping processing carried out by the projectors 10. Hereinafter, the grouping processing carried out by the projector 10A will be described. Before this grouping processing, the projector 10A is in the standby mode, and each of the projectors 10B to 10F is either in the state where its startup has been completed or in the standby mode, for example.

The CPU 11 of the projector 10A receives a startup instruction signal which gives an instruction to start up, from the remote controller 20 via the signal receiving unit 15 (Step S1). The CPU 11 starts up the projector 10A in response to the received startup instruction signal (Step S2).

Next, the CPU 11 determines whether startup has been done in response to an operation on the "GROUP ON" key 22 or not (Step S3). If the result of the determination in Step S3 is "YES", the CPU 11 accepts an input of group information by the user on the basis of the startup instruction signal received in Step S1 (Step S4). Here, if the "0" key of the ten keys 23 is operated by the user, the CPU 11 accepts an input of "G0" as the group information.

After the startup is completed, the CPU 11 causes an apparatus information screen to be displayed on the screen 30 via the projection unit 17 (Step S5). The apparatus information screen includes the group information whose input is accepted by the projector 10A, and individual information. The individual information is information unique to the projector 10 and, in this example, includes the IP address and MAC address.

Figure 5:
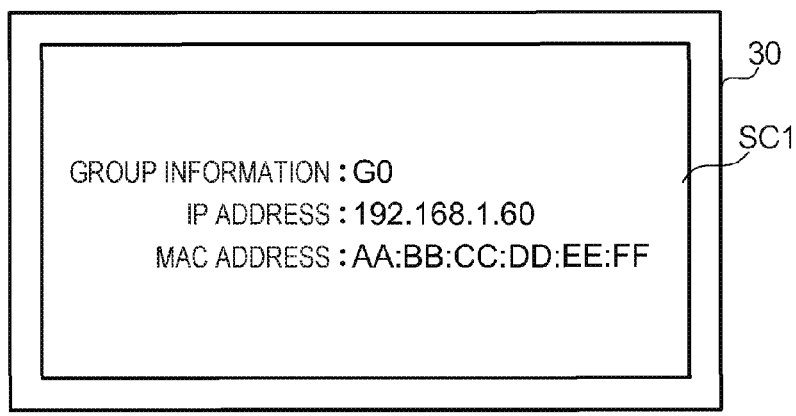
FIG. 5 is an explanatory view of an apparatus information screen displayed in Step S5 according to the first embodiment.

FIG. 5 explains the apparatus information screen displayed by the projector 10A. As shown in FIG. 5, an apparatus information screen SC1 shows "G0", which is the group information of the projector 10A, "192.168.1.60", which is the IP address of the projector 10A, and "AA:BB:CC:DD:EE:FF", which is the MAC address of the projector 10A. By viewing the apparatus information screen SC1, the user can grasp the relation between the projector 10A started up by the user, and the group information and the individual information.

Next, the CPU 11 periodically transmits the group information and the individual information displayed in Step S5 to each of the other projectors 10B to 10F via the communication unit 19 (Step S6). Here, the CPU 11 transmits the group information and the individual information by broadcasting to the network NW (broadcast transmission).

Meanwhile, if the result of the determination in Step S3 is "NO", the CPU 11 carries out normal startup (Step S7). The CPU 11 does not perform the processing of Steps S4 to S6 if a startup instruction signal is received in response to an operation on the "STANDBY/ON" key 21 of the remote controller 20. That is, the CPU 11 does not transmit the group information and the individual information to the projectors 10B to 10F.

While the grouping processing carried out by the projector 10A is described above, each of the projectors 10B to 10F similarly performs the grouping processing. Here, the user designates "G0" as the group information to each of the projectors 10B, 10C and 10D. Then, each of the projectors 10B, 10C and 10D periodically transmits "G0", which is the group information, and the individual information to the other projectors 10.

In this example, it is assumed that no group information is inputted to the projectors 10E and 10F.

Display Processing for Apparatus Selection Screen

Figure 6:
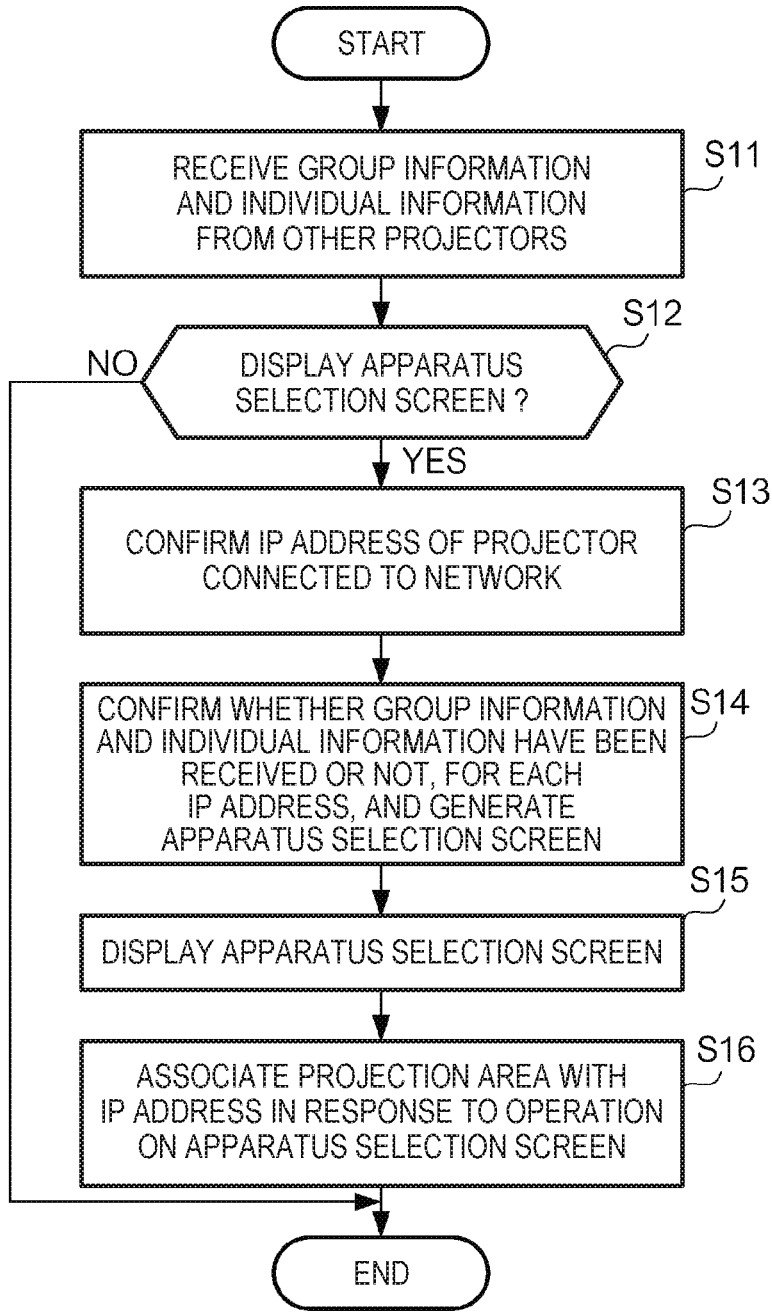
FIG. 6 is a flowchart showing display processing for an apparatus selection screen carried out by the projector according to the first embodiment.

FIG. 6 is a flowchart showing display processing for an apparatus selection screen carried out by the projectors 10. The apparatus selection screen is a screen for selecting a position of arrangement of a partial image displayed by each projector 10 in tiling projection. Hereinafter, the display processing for the apparatus selection screen carried out by the projector 10A will be described.

The CPU 11 of the projector 10A receives group information and individual information from other projectors 10 via the communication unit 19 (Step S11). In Step S11, the CPU 11 receives the group information and the individual information transmitted by the other projectors 10 in Step S6. Here, the CPU 11 receives "G0", which is the group information, and the individual information from each of the projectors 10B, 10C and 10D.

Next, the CPU 11 determines whether to display an apparatus selection screen or not (Step S12). In this embodiment, one arbitrary projector 10 displays an apparatus selection screen on the screen 30. The projector 10 which displays the apparatus selection screen may be designated by an operation on the remote controller 20 or may be defined as the first projector 10 to be given the group information, or the like.

If the result of the determination in Step S12 is "YES", the CPU 11 confirms the IP address of the projector 10 connected to the network NW (Step S13). In this example, the CPU 11 confirms the IP addresses of all of the projectors 10 connected to the network NW, that is, the IP addresses of the projectors 10B to 10F (see FIG. 1B).

Next, the CPU 11 confirms whether the group information and the individual information have been received or not, for each IP address confirmed in Step S13, and generates an apparatus selection screen (Step S14). Here, the CPU 11 determines that the group information and the individual information have been received with respect to the IP addresses of the projectors 10B to 10D, and determines that the group information and the individual information have not been received with respect to the projectors 10E and 10F. Then, the CPU 11 causes the generated apparatus selection screen to be displayed on the screen 30 (Step S15).

Figure 7A:
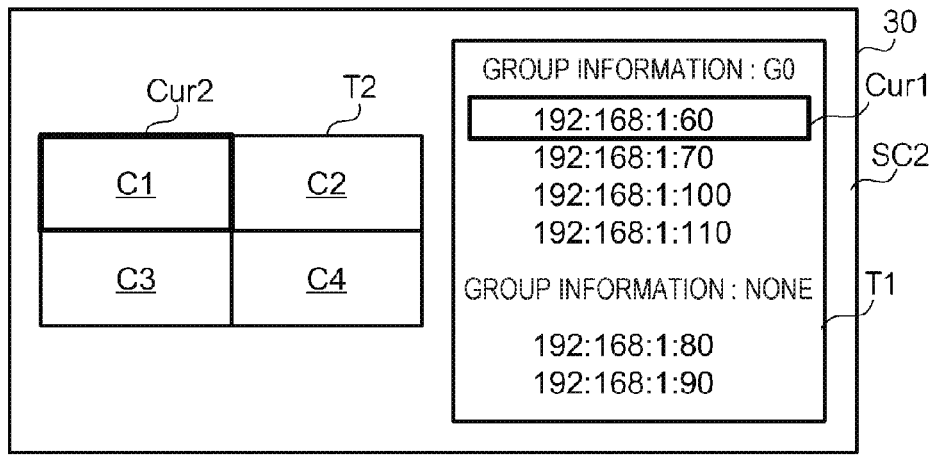
FIGS. 7A to 7C are explanatory views of the apparatus selection screen displayed in Step S15 according to the first embodiment.
Figure 7B:
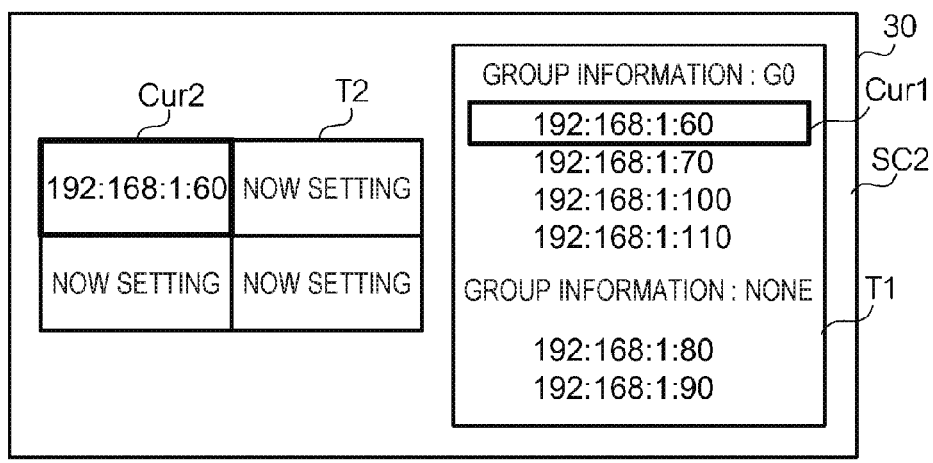
Figure 7C:
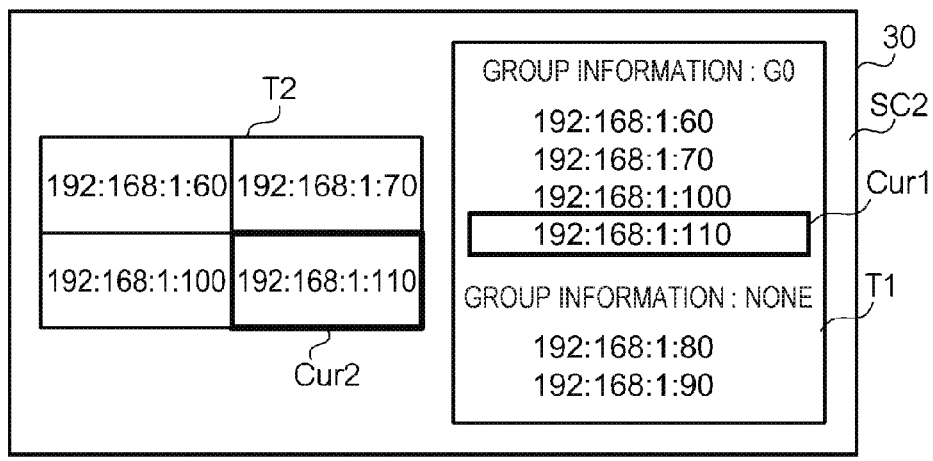

FIGS. 7A to 7C explain the apparatus selection screen displayed in Step S15. On an apparatus selection screen SC2 shown in FIG. 7A, the designated group information and the IP address of each of the projectors 10A to 10D are displayed in association with each other in an area T1. Specifically, in the area T1, the IP address of the projector 10A "192.168.1.60", the IP address of the projector 10B "192.168.1.70", the IP address of the projector 10C "192.168.1.100", and the IP address of the projector 10D "192.168.1.110" are displayed in association with the group information "G0". Since the user has designated the group information to the projectors 10 using the remote controller 20, the user can grasp that the IP addresses displayed in the area T1 correspond to the projectors 10 selected by the user. Also, in the area T1, the IP address of the projector 10E "192.168.1.80" and the IP address of the projector 10F "192.168.1.90" are displayed as the projectors 10 to which no group information is designated.

Also, on the apparatus selection screen SC2, setting areas C1 to C4 corresponding to individual projection areas on the screen 30 (that is, positions of arrangement of partial images) are displayed in an area T2. In this example, the projection area 30-1 corresponds to the setting area C1. The projection area 30-2 corresponds to the setting area C2. The projection area 30-3 corresponds to the setting area C3. The projection area 30-4 corresponds to the setting area C4.

Back to FIG. 6, the CPU 11 associates the projection areas on the screen 30 with the IP addresses of the projectors 10 displaying partial images on their respective projection areas in response to an operation on the remote controller 20 (Step S16). Operations on the apparatus selection screen are carried out using cursors Cur1 and Cur2 shown in FIG. 7A. After starting to display the apparatus selection screen SC2, the CPU 11 places the cursor Cur2 on one of the setting areas that are not associated with any IP address yet, of the setting areas C1 to C4. If an operation of selecting one of the IP addresses is carried out with the cursor Cur1 in this state, the CPU 11 associates the IP address designated by the cursor Cur1, with the projection area corresponding to the setting area designated by the cursor Cur2. In the example of FIG. 7B, the IP address of the projector 10A "192.168.1.60" is associated with the projection area 30-1 corresponding to the setting area C1. With respect to the setting areas C2 to C4, where "NOW SETTING" is shown, no IP address is associated with the corresponding projection areas yet. After associating an IP address with one projection area, the CPU 11 shifts the cursor Cur2 to another setting area and continues to accept the operation of associating an IP address. As this association is completed, the CPU 11 displays the apparatus selection screen SC2 shown in FIG. 7C. Thus, the setting for performing the tiling projection described with reference to FIGS. 1A and 1B is completed.

Subsequently, according to this setting, exchange of information to perform the tiling projection and control for the tiling projection are carried out among the plurality of projectors 10.

The CPU 11 may shift the cursor Cur2 in response to an operation on the remote controller 20. Also, the CPU 11 may associate the IP addresses of the projectors 10E and 10F, which are not associated with any group information, with projection areas. Also, the CPU 11 may associate IP addresses associated with different group information from each other, with a plurality of projection areas on the screen 30. Moreover, the CPU 11 may avoid displaying the IP address of a projector 10 to which no group information is designated, on the apparatus selection screen.

The validity period of the grouping is not particularly defined. The grouping may remain valid even after the projectors 10 are shut down.

According to the first embodiment described above, a projector 10 displays the apparatus selection screen, associating the group information inputted to the projector 10 itself with the IP address of the projector 10 itself, and associating the group information inputted to other projectors 10 with the IP addresses of the other projectors 10. Since the user has designated the group information to the projectors 10 by operating the remote controller 20, the user can grasp that the IP addresses displayed in the area T1 correspond to the projectors 10 designated by the user. Therefore, by referring to the group information of each projector 10 and selecting a projector 10 to be operated, the user can select a position of arrangement of a partial image using a desired projector 10.

Second Embodiment

Figure 8:
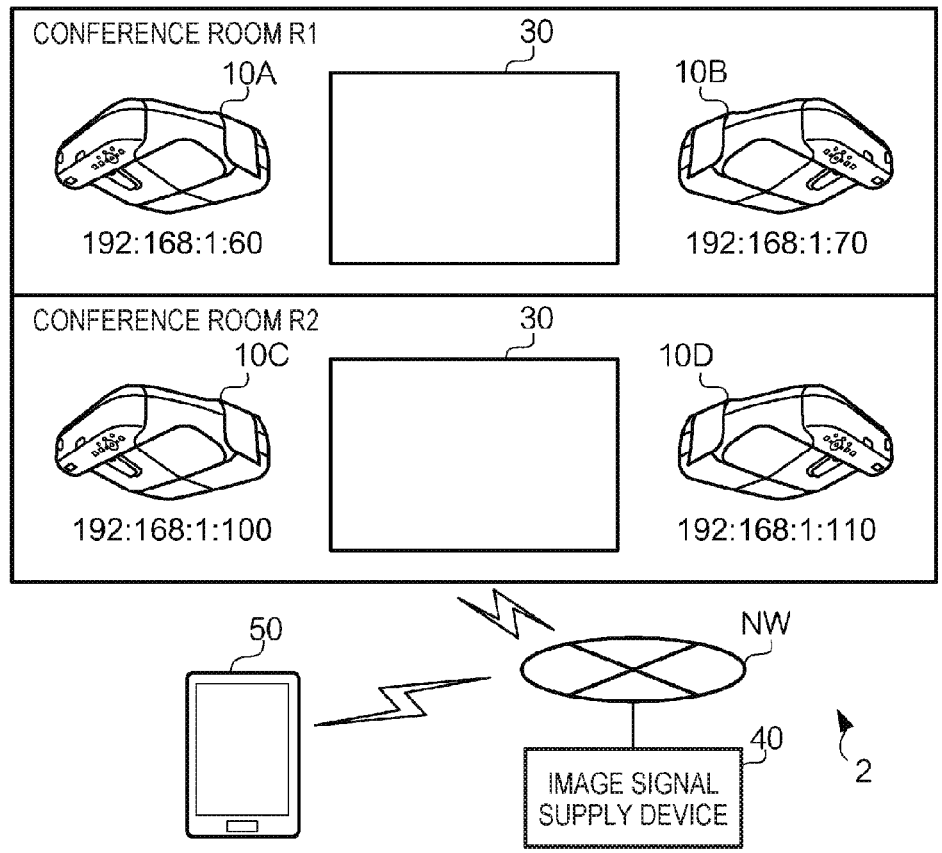
FIG. 8 is a block diagram showing the overall configuration of a display system according to a second embodiment of the invention.

FIG. 8 shows the overall configuration of a projector system 2 according to a second embodiment of the invention. In this embodiment, the hardware circuits denoted by the same reference sings as those in the first embodiments are the same as the hardware circuits described in the first embodiment.

As shown in FIG. 8, the projector system 2 is a display system including projectors 10A to 10D, an image signal supply device 40, and a management device 50. The hardware configuration of each projector 10 may be the same as that in the first embodiment and therefore will not be described further in detail here. The IP addresses of the projectors 10A to 10D are the same as those in the first embodiment, as shown in FIG. 8.

The projectors 10A and 10B are arranged in a conference room R1, which is the same room space. The projectors 10C and 10D are arranged in a conference room R2, which is the same room space. Each of the projectors 10A to 10D can communicate via a network NW. The image signal supply device 40 and the management device 50 are also connected to the network NW. In this example, the management device 50 is a smartphone and performs remote control on the projectors 10 via the network.

The management device 50 may be a device having the function of connecting to the network NW, such as a personal computer.

In this embodiment, the projector system 2 includes four projectors 10. However, the projector system 2 may include three or fewer projectors 10, or five or more projectors 10.

Figure 9:
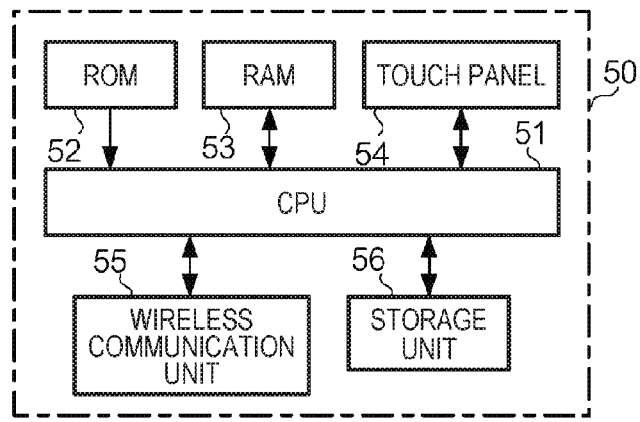
FIG. 9 shows the hardware configuration of a management device according to the second embodiment.

FIG. 9 is a block diagram showing the hardware configuration of the management device 50. As shown in FIG. 9, the management device 50 has a CPU 51, a ROM 52, a RAM 53, a touch panel 54, a wireless communication unit 55, and a storage unit 56.

The CPU 51 reads out a program stored in the ROM 52 or the storage unit 56 into the RAM 53 and executes the program, thus controlling each part of the management device 50.

The touch panel 54 has a display unit such as a liquid crystal display, and a touch sensor as an operation unit provided in a planar form superimposed on the display surface of the display unit. The touch panel 54 displays a screen for texts, GUI (graphic user interface) or the like.

The wireless communication unit 55 has a wireless communication circuit and an antenna, for example, and wirelessly communicates with an external electronic apparatus. The wireless communication unit 55 connects to the network NW and performs wireless communication conforming to the IEEE 802.11 standard.

The storage unit 56 has a non-volatile semiconductor memory, for example, and stores a program executed by the CPU 51 and other data. The storage unit 56 stores an application program for causing the management device 50 to function as a remote controller of the projectors 10, for example.

Figure 10:
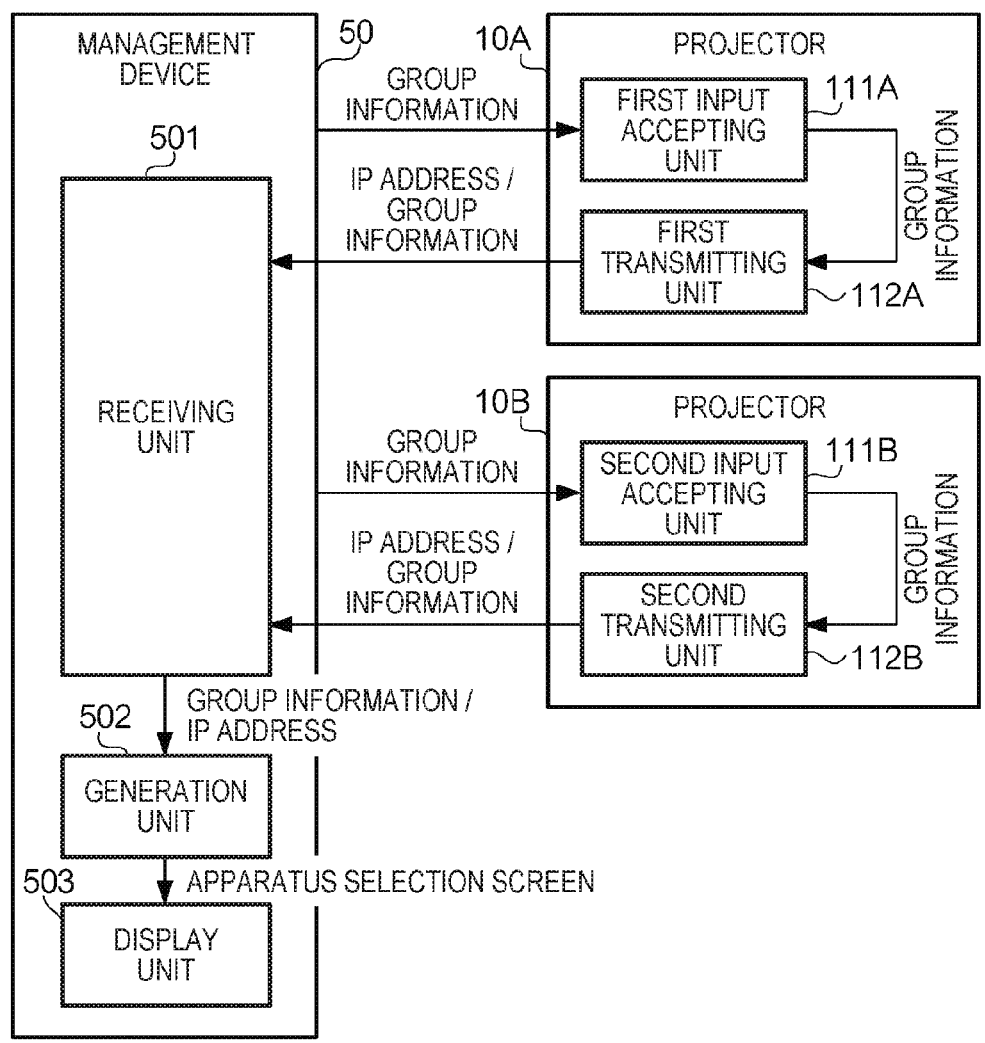
FIG. 10 shows the functional configuration of the management device and a projector according to the second embodiment.

FIG. 10 is a block diagram showing the functional configurations of the management device 50 and the projectors 10. In FIG. 10, the functional configurations of the projectors 10A and 10B, of the projectors 10, are shown. As shown in FIG. 10, the management device 50 implements functions equivalent to a receiving unit 501, a generation unit 502, and a display unit 503. The projector 10A implements functions equivalent to a first input accepting unit 111A and a first transmitting unit 112A.

The first input accepting unit 111A is a unit which accepts an input of group information from the user via the management device 50. This group information is first group information indicating the group in which the projector 10A (first electronic apparatus) is classified.

The first transmitting unit 112A is a unit which transmits the identification information of its own device (first identification information) and the group information whose input is accepted by the input accepting unit 111A (first group information), to the management device 50. In this embodiment, the IP address of the projector 10A is used as the identification information.

The second input accepting unit 111B is a unit which accepts an input of group information from the user via the management device 50. This group information is second group information indicating the group in which the projector 10B (second electronic apparatus) is classified.

The second transmitting unit 112B is a unit which transmits the identification information of its own device (second identification information) and the group information whose input is accepted by the input accepting unit 111B (second group information), to the management device 50. In this embodiment, the IP address of the projector 10B is used as the identification information.

The receiving unit 501 is a unit which receives the identification information and the group information from each of the projectors 10A and 10B via the network NW.

The generation unit 502 is a unit which generates a selection screen for selecting a projector 10 to be operated, on the basis of the identification information and the group information received by the receiving unit 501.

The display unit 503 is a unit which displays the selection screen generated by the generation unit 502.

Also, the projectors 10C and 10D implement the same functions as the projectors 10A and 10B.

Grouping Processing

Figure 11:
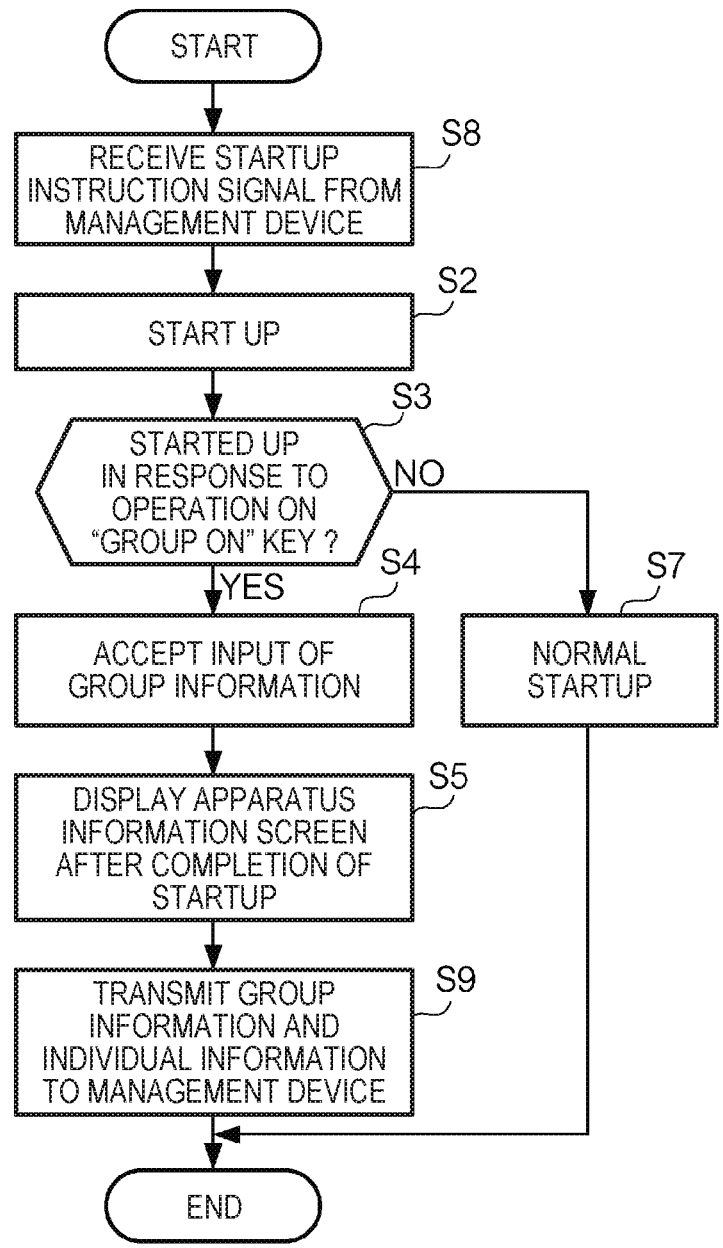
FIG. 11 is a flowchart showing grouping processing carried out by the projector according to the second embodiment.

FIG. 11 is a flowchart showing the grouping processing carried out by the projectors 10. In the grouping processing, the processing of Steps S2 to S5 and Step S7 may be the same processing as in the first embodiment. In the grouping processing in this embodiment, the processing of Step S8 is executed instead of the processing of Step S1, and the processing of Step S9 is executed instead of the processing of Step S6. Specifically, in Step S8, the CPU 11 of the processor 10 receives a startup instruction signal which gives an instruction to start up, from the management device 50 via the network NW and the communication unit 19. The CPU 11 causes the touch panel 54 to display an operator image (soft buttons) corresponding to the individual buttons of the remote controller 20 described with reference to FIG. 1A. In some cases, the startup instruction signal may include group information, as in the first embodiment. The group information is designated by the user operating the touch panel 54.

In step S9, the CPU 11 transmits the group information designated to its own device and individual information to the management device 50 via the communication unit 19. In this example, it is assumed that "G1" is designated to the projectors 10A and 10B as the group information, and that "G2" is designated to the projectors 10C and 10D as the group information.

Display Processing for Apparatus Selection Screen

Figure 12:
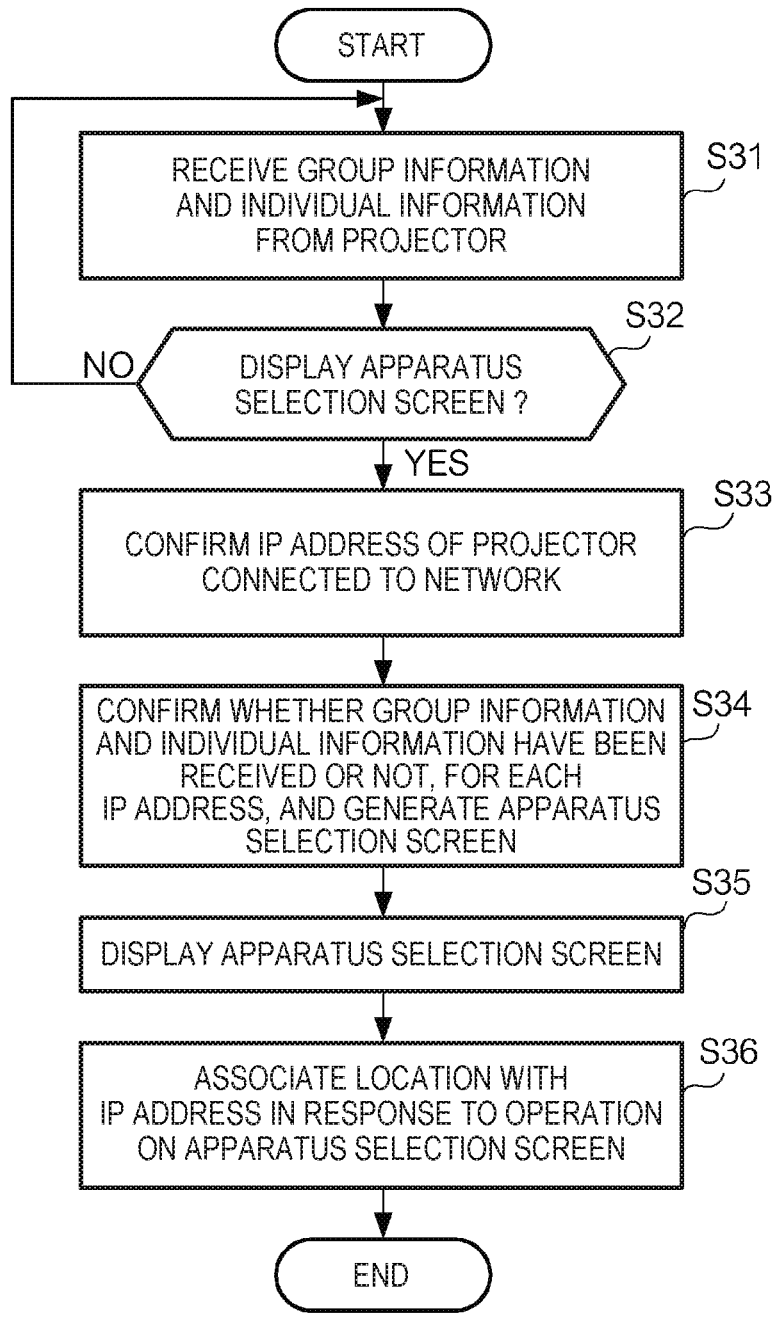
FIG. 12 is a flowchart showing display processing for an apparatus selection screen carried out by the management device according to the second embodiment.

FIG. 12 is a flowchart showing display processing for an apparatus selection screen carried out by the management device 50.

The CPU 51 of the management device 50 receives the group information and the individual information from each of the projectors 10A to 10D via the wireless communication unit 55 (Step S31). In Step S31, the CPU 51 receives the group information and the individual information transmitted from the projectors 10 in Step S8.

Next, the CPU 51 determines whether to display an apparatus selection screen or not (Step S32). The CPU 51 determines to display an apparatus selection screen at a predetermined timing such as when a predetermined operation is carried out by the user.

If the result of the determination in Step S32 is "YES", the CPU 51 confirms the IP address of the projector 10 connected to the network NW (Step S33). In this example, the CPU 51 confirms the IP addresses of all of the projectors 10 connected to the network NW, that is, the IP addresses of the projectors 10A to 10D (see FIG. 9).

Next, the CPU 51 determines whether the group information and the individual information have been received or not, for each IP address confirmed in Step S33, and generates an apparatus selection screen (Step S34). Here, the CPU 51 determines that the group information and the individual information have been received with respect to the IP addresses of the projectors 10A to 10D. Then, the CPU 51 causes the touch panel 54 to display the generated apparatus selection screen (Step S35).

Figure 13A:
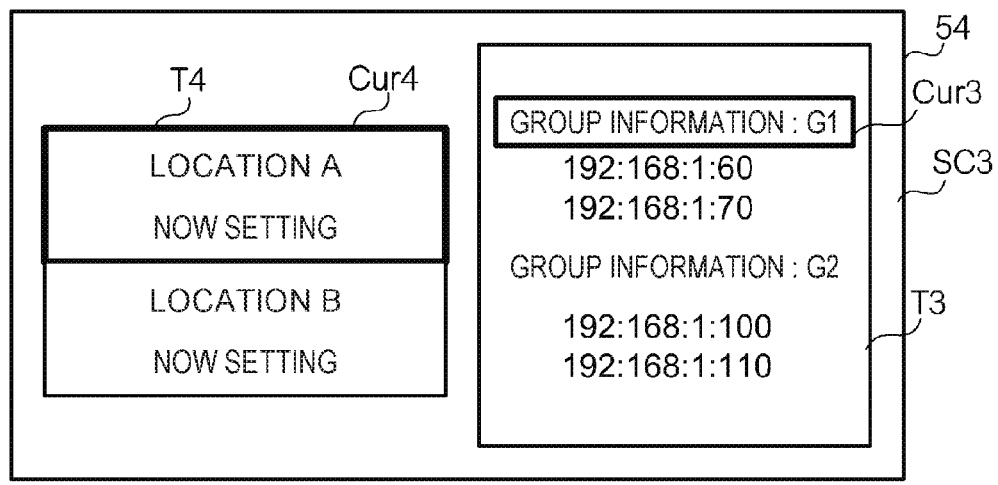
FIGS. 13A and 13B are explanatory views of the apparatus selection screen displayed in Step S35 according to the second embodiment.
Figure 13B:
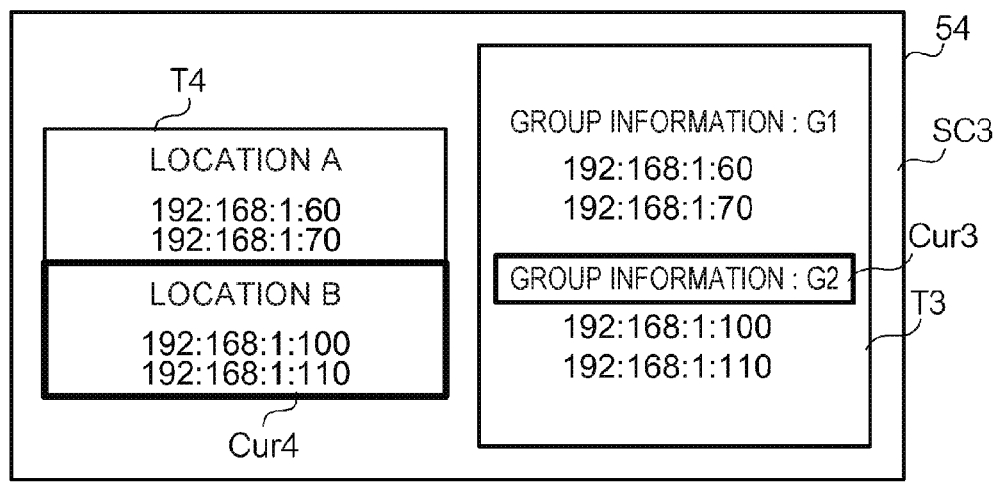

FIGS. 13A and 13B explain the apparatus selection screen displayed in Step S35.

On an apparatus selection screen SC3 shown in FIG. 13A, the designated group information and the IP address of each of the projectors 10A to 10D are displayed in association with each other in an area T3. In the area T3, the IP address of the projector 10A "192.168.1.60" and the IP address of the projector 10B "192.168.1.70" are displayed in association with the group information "G1". Also, in the area T3, the IP address of the projector 10C "192.168.1.100" and the IP address of the projector 10D "192.168.1.110" are displayed in association with the group information "G2".

Also, on the apparatus selection screen SC3, a screen for selecting a location of a projector 10 is displayed in an area T4. The location indicates the position (in this example, a space) where the projector 10 is arranged, and is associated with a projection area where the projector 10 projects an image. In the area T4, information about "Location A" and "location B" indicating different locations from each other is displayed. In the illustration, "NOW SETTING" means that no IP address is associated with each location.

Back to FIG. 12, the CPU 51 associates the locations with the IP addresses of the projectors 10 arranged at these locations, in response to an operation on the apparatus selection screen (Step S36). Operations on the apparatus selection screen are carried out using cursors Cur3 and Cur4 shown in FIG. 13A. After starting to display the apparatus selection screen SC3, the CPU 51 places the cursor Cur4 on one of the locations that is not associated with any IP address yet, of the locations displayed in the area T4. If an operation of selecting one of these items of group information is carried out with the cursor Cur3 by the user in this state, the CPU associates the IP address associated with the group information designated by the cursor Cur3, with the location designated by the cursor Cur4. In the example of FIG. 13B, "Location A" is associated with the IP address "192.168.1.60" and the IP address "192.168.1.70" corresponding to the group information "G1", and "Location B" is associated with the IP address "192.168.1.100" and the IP address "192.168.1.110" corresponding to the group information "G2". After associating the locations with the IP addresses, the CPU 51 completes the setting for performing tiling projection at these locations.

Subsequently, according to this setting, exchange of information to perform the tiling projection and control for the tiling projection are carried out among the plurality of projectors 10.

The CPU 51 may shift the cursor Cur4 in response to an operation on the remote controller 20. Also, the CPU 51 may perform remote control on two or more projectors 10 classified in the same group, in order for these projectors 10 to perform uniform control. Such remote control may be a startup request or a shutdown request.

According to the second embodiment described above, the management device 50 displays the apparatus selection screen, associating the group information inputted to one projector 10 with the IP address of this projector 10, and associating the group information inputted to another projectors 10 with the IP address of this another projector 10. Since the user has designated the group information to the projectors 10 by operating the management device 50, the user can grasp that the IP addresses displayed in the area T3 correspond to the projectors 10 designated by the user. Therefore, by referring to the group information of each projector 10 and selecting a projector 10 to be operated, the user can associate locations with desired combinations of projectors 10.

Modifications

The invention can also be carried out in different forms from the embodiments. Also, the following modifications may be suitably combined.

In the embodiments, the operations using the remote controller 20 may be replaced by operations on the main body operation unit 14. The operations on the physical buttons may be replaced by operations on the soft buttons.

The input of group information need not be carried out solely by operating the "GROUP ON" key 22. In this case, the ten keys 23 need not be provided on the remote controller 20.

As the identification information of each projector 10, information other than the IP address may be used. This identification information may be the MAC address or the name of each projector 10 and may be any information that can identify each projector 10.

The projectors 10 or the management device 50 may limit the projectors 10 that can be used for tiling projection on the basis of the group information. In this case, tiling projection may be carried out with a combination of projectors 10 to which the same group information is designated.

The details of the information display screen and the apparatus selection screen described in the embodiments, and the operations carried out using each screen are simply examples.

In the embodiments, the case where tiling projection is carried out in the projector system is described. However, the projector system may be used for purposes other than tiling projection. For example, in the projector system, operation information may be exchanged among two or more projectors 10 which carry out stacked projection. In this case, too, the selection screen for selecting a projector 10 to be operated is displayed on the screen 30 or the management device 50.

In the embodiments, all of the projectors 10 can generate and display the apparatus selection screen. However, this is not necessarily required. The projectors 10 other than the projector which generates and displays the apparatus selection screen need not have the function of transmitting their own IP addresses and individual information.

In the embodiments, the grouping of the projectors 10 is described. However, the invention is also applicable to grouping of various display devices. The display device in such cases is not limited to a front-projection projector and may be a rear-projection projector or a display device with a direct-view monitor such as a liquid crystal display, for example. Also, the grouping technique described in the second embodiment is applicable to grouping of electronic apparatuses other than the display device. The invention may also be applied to grouping in the case of simultaneously controlling a plurality of electronic apparatuses such as computer devices, for example.

The invention can also be understood as a method for controlling a display device or as a method for controlling an electronic apparatus.

What is claimed is:

1. A display device within a plurality of display devices, the display device comprising:
   an input accepting unit which accepts an input of first group information that represents a first group of display devices included within the plurality of display devices;
   a receiving unit which receives, from another display device within the plurality of display devices, second identification information of the another display device and second group information, which represents a second group of display devices within the plurality of display devices, inputted to the another display device;
   a generation unit which generates a selection screen for selecting one or more display devices of the plurality of display devices to be operated, the selection screen including first identification information of the display device displayed to be associated with the first group information and the second identification information displayed to be associated with the second group information; and
   a display unit which displays the selection screen that is generated.

2. The display device according to claim 1, comprising a transmitting unit which transmits the first identification information and the first group information to the another display device.

3. The display device according to claim 1, wherein the generation unit generates, as the selection screen, a screen for associating the first identification information with a position of arrangement of an image displayed by the display device and for associating the second identification information with a position of arrangement of an image displayed by the another display device.

4. The display device according to claim 1, wherein the input accepting unit accepts an input of the first group information associated with a physical button that is operated.

5. A display system comprising:
   a plurality of electronic apparatuses comprising:

a first electronic apparatus; and
a second electronic apparatus; and
a management device connected to the first electronic apparatus and the second electronic apparatus,
wherein the first electronic apparatus includes:
- a first input accepting unit which accepts an input of first group information, which represents a first group of electronic apparatuses within the plurality of electronic apparatuses, via the management device; and
- a first transmitting unit which transmits first identification information of the first electronic apparatus and the first group information to the management device, wherein the second electronic apparatus includes:
- a second input accepting unit which accepts an input of second group information which represents a second group of electronic apparatuses within the plurality of electronic apparatuses, via the management device; and
- a second transmitting unit which transmits second identification information of the second electronic apparatus and the second group information to the management device, and wherein the management device includes:
- a receiving unit which receives the first identification information and the first group information from the first electronic apparatus, and receives the second identification information and the second group information from the second electronic apparatus;
- a generation unit which generates a selection screen for selecting one or more electronic apparatuses from the plurality of electronic apparatuses to be operated, the selection screen including the first identification information displayed to be associated with the first group information and the second identification information displayed to be associated with the second group information; and
- a display unit which displays the selection screen that is generated.

6. The display system according to claim 5, wherein each of the first electronic apparatus and the second electronic apparatus is a display device.

7. The display system according to claim 6, wherein the generation unit generates, as the selection screen, a screen for associating the first identification information with a position of arrangement of an image displayed by the first electronic apparatus and for associating the second identification information with a position of arrangement of an image displayed by the second electronic apparatus.

8. A method for controlling a display device within a plurality of display devices, the method comprising:
- accepting an input of first group information, which represents a first group of display devices included within the plurality of display devices, from a user;
- receiving, from another display device within the plurality of display devices, second identification information for identifying the another display device, and second group information which represents a second group of display devices within the plurality of display devices, inputted to the another display device;
- generating a selection screen for selecting one or more display devices from the plurality of display devices to be operated, the selection screen including first identification information for identifying the display device displayed to be associated with the first group information and the second identification information displayed to be associated with the second group information in the selection screen; and
- displaying the selection screen that is generated.

* * * * *